F. MANTELL.
MACHINE FOR MAKING ICE CREAM CONES.
APPLICATION FILED OCT. 8, 1918.
1,319,406.
Patented Oct. 21, 1919.
2 SHEETS—SHEET 1.
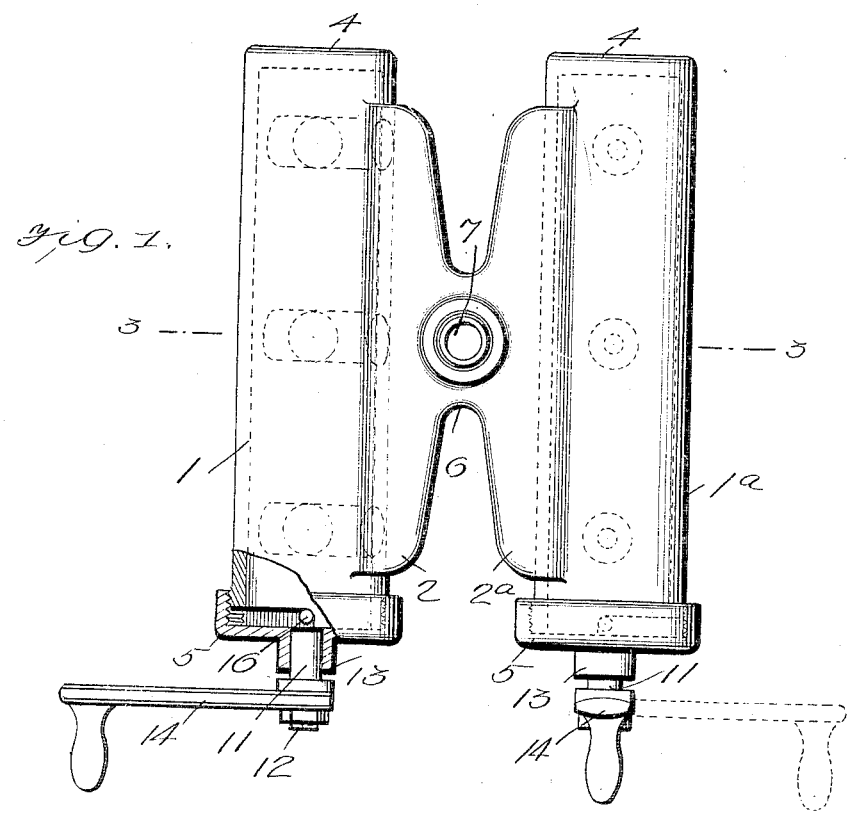
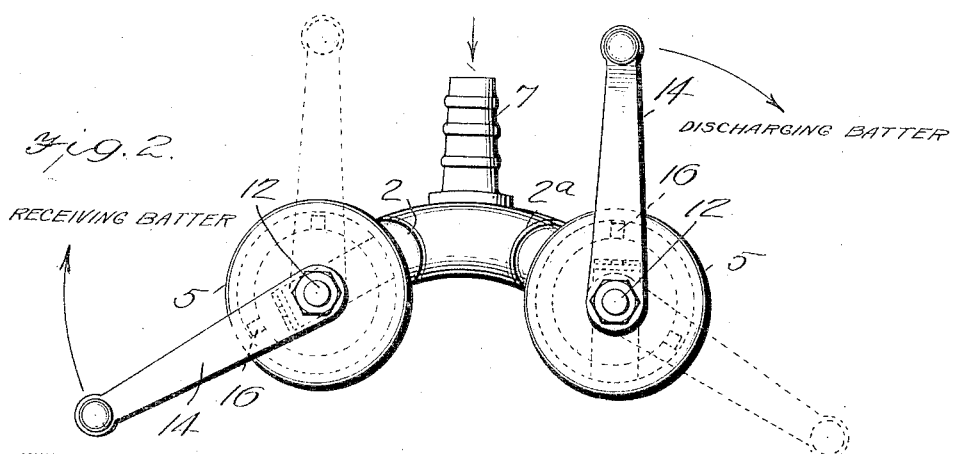
WITNESSES
INVENTOR
Frank Mantell
BY
ATTORNEYS

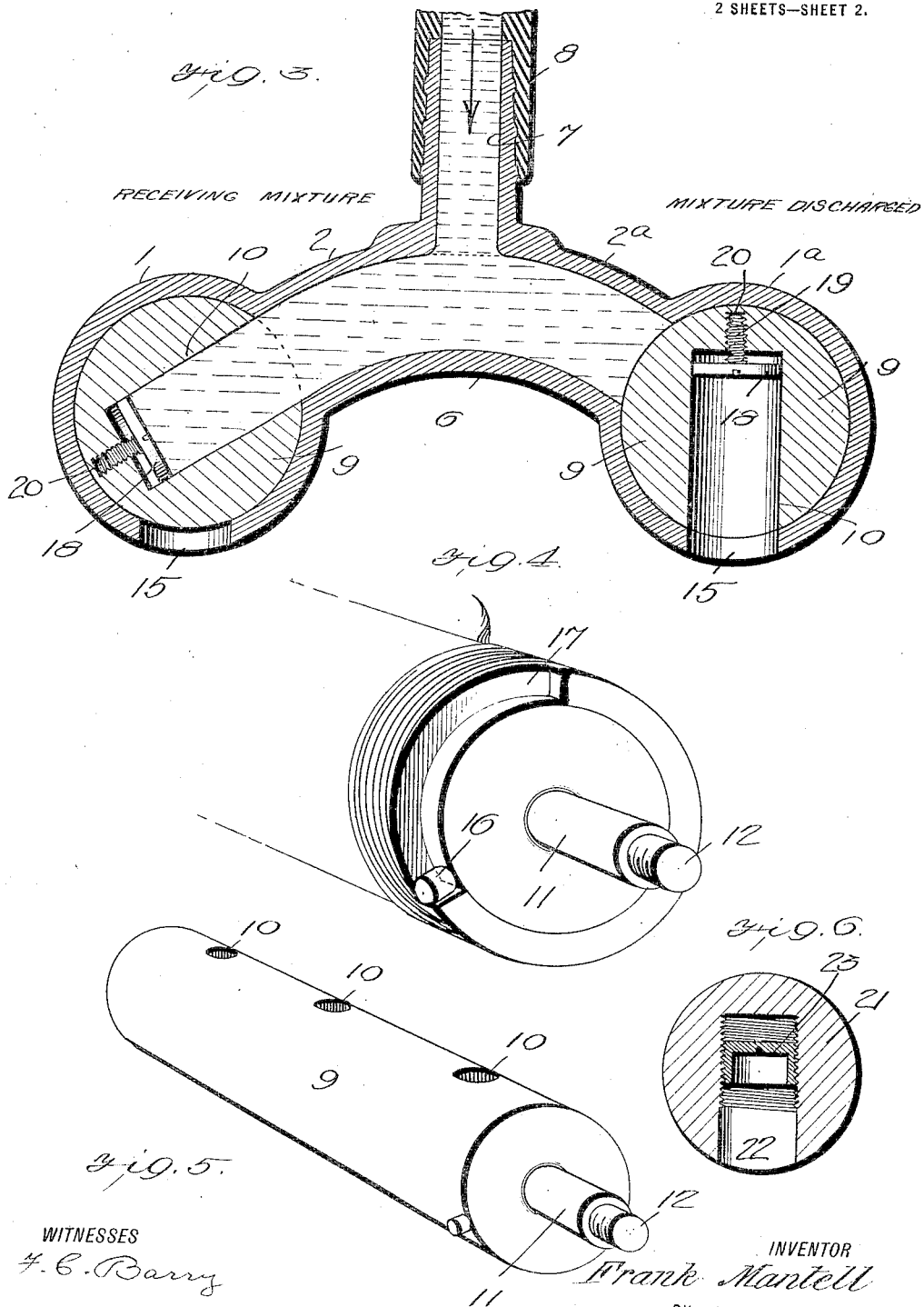

UNITED STATES PATENT OFFICE.

FRANK MANTELL, OF CONNELLSVILLE, PENNSYLVANIA.

MACHINE FOR MAKING ICE-CREAM CONES.

1,319,406.      Specification of Letters Patent.      Patented Oct. 21, 1919.

Application filed October 8, 1918. Serial No. 257,321.

*To all whom it may concern:*

Be it known that I, FRANK MANTELL, a citizen of the United States, and a resident of Connellsville, in the county of Fayette and State of Pennsylvania, have invented new and useful Improvements in Machines for Making Ice-Cream Cones, of which the following is a specification.

My invention is an improvement in machines for making ice cream cones, and has for its object to provide a machine of the character specified into which the batter may be fed and which will separate the batter into cylindrical masses of the proper size for making an ice cream cone.

In the drawings:

Figure 1 is a top plan view of the improved machine;

Fig. 2 is an end view;

Fig. 3 is a section on the line 3—3 of Fig. 1.

Fig. 4 is a perspective view of a part of one of the forming cylinders;

Fig. 5 is a similar view of the complete cylinder;

Fig. 6 is a transverse section of a cylinder showing another embodiment of the invention.

In the present embodiment of the invention, two cylindrical casings 1 and 1ª are provided, which are arranged in parallel spaced relation and are connected by extensions 2 and 2ª. One end of each cylinder is closed, as indicated at 4, by an integral head, and the other end of each cylinder is closed by a threaded cap 5. These extensions 2 and 2ª are tapering, as shown more particularly in Fig. 1, extending approximately the full length of the cylinders at their connection with the cylinders, and tapering to their connection with each other. At this narrow connection 6 between the extensions there is an inlet nipple 7 to which a hose 8 may be connected leading from a supply of the batter from which the cones are to be formed. Through this hose and nipple the batter is fed to the extensions 2 and 2ª, and by the extensions the batter is fed to the forming cylinders to be described.

A cylinder 9 is arranged in each casing 1 and 1ª, and each of the said cylinders is provided with a series of radial openings 10, three in the present instance, the said openings being arranged in spaced relation and being adapted to receive the batter from the extensions 2 and 2ª. Each of the cylinders has a journal pin 11 at the end adjacent to the head 5 and each of the journal pins has a reduced threaded extension 12. Each head 5 has a bearing nipple 13 through which the journal pins 11 extend, and a crank 14 is engaged with each of the reduced threaded extensions 12. By means of the cranks the cylinders may be turned, to bring the openings 10 into register with the extensions 2 and 2ª or with a series of openings 15 in the under sides of the cylinders. These openings 15 are spaced to correspond with the openings 10, and are of the same size, so that when an opening 10 full of batter is in register with an opening 15 the load of batter may drop out into a suitable receptacle provided therefor.

Means is provided for limiting the rotation of the cylinders to a point such that the openings 10 will register with the extensions 2 and 2ª or with the openings 15. The said mechanism comprises a radial pin 16 on each cylinder, which is adapted to engage the ends of a cut away portion 17 in the cylinder, the ends of the said cut away portion forming stops for engagement by the pins to limit the movement of the cylinder.

Means is also provided for varying the capacity of the radial openings. In Fig. 3 the said means comprises plates 18 of a size to fit within the openings, and each plate has a threaded stem 19, which engages a threaded opening 20 in the cylinder at the bottom of the opening 10. These plates have kerfs for engagement by a tool to turn the plates to raise or lower the same in the openings, and it will be evident that by turning the plate in the proper direction the capacity of each opening may be varied.

In Fig. 6 is shown a modified construction. In this arrangement the cylinder 21 has the radial openings 22 which are threaded throughout a great part of their extent, and a cap 23 is threaded into each opening, the cap having its closed end adjacent to the bottom of the opening. The caps have kerfs, as shown, for engagement by a screwdriver or the like for turning the caps to vary the capacity of the openings.

In operation, the batter is fed through the hose, as shown in Fig. 3, and through the nipple 7 into the extensions 2 and 2ª. At the left of Fig. 3 the cylinder 9 is in receiving position, the openings 10 registering with the extension 2. The batter flows into the openings, as shown, and by means of the crank 14 the cylinder may be turned to cause the openings 10 to register with the openings 15, as shown at the right of Fig. 3. Here the batter is discharged into a suitable receiver, and is ready for baking.

I claim:

1. A machine of the character specified comprising a pair of casings arranged in parallel spaced relation, said casings having hollow extensions connected between the casings, the connection having an inlet nipple for connection with a source of batter supply, a cylinder in each casing, each cylinder having a longitudinal series of radial openings and each casing having openings to correspond with the openings in the cylinder on its under side, a crank connected with each cylinder for turning the same to cause the radial openings to register with the extension or with the openings at the under side of the casing, means for limiting the movement of the cylinder to such position, and means for varying the capacity of each of the radial openings.

2. A machine of the character specified comprising a pair of casings arranged in parallel spaced relation, said casings having hollow extensions connected between the casings, the connection having an inlet nipple for connection with a source of batter supply, a cylinder in each casing, each cylinder having a longitudinal series of radial openings and each casing having openings to correspond with the openings in the cylinder on its under side, means for rotating each cylinder, means for limiting the movement of each cylinder to register with the extension or with the openings on the under side, and means for varying the capacity of each opening.

3. A machine of the character specified comprising a pair of casings arranged in parallel spaced relation, said casings having hollow extensions connected between the casings, the connection having an inlet nipple for connection with a source of batter supply, a cylinder in each casing, each cylinder having a longitudinal series of radial openings and each casing having openings to correspond with the openings in the cylinder on its under side, and means for rotating each cylinder, and means for limiting the movement of each cylinder to register with the extension or with the openings on the under side.

4. A machine substantially as described comprising a casing having cylindrical chambers spaced apart, a supply nipple between said chambers and connecting chambers between the cylindrical chambers and the nipple, the said connecting chambers communicating with the nipple and flaring thence toward their respective chambers and communicating at their wider ends with the said cylindrical chambers, and discharge cylinders operating within the cylindrical chambers, substantially as set forth.

5. In a machine substantially as described, the combination with the spaced apart cylindrical chambers having threaded ends cut away for a portion of their circumference forming stops at the opposite ends of the cut away portion, cylinders operating in their respective chambers and having pins operating in the cut away portions thereof, and caps threaded on the cylindrical portions of the cylinders and housing the stop pins, all substantially as and for the purpose set forth.

6. A machine of the character specified comprising a casing, a cylinder in the casing, the cylinder having a longitudinally extending series of radial openings, and the casing having openings to correspond with those of the cylinder on its under side, said cylinder having means for permitting dough to be supplied to the radial openings at the upper side of the casing, means for rotating the cylinder to register with the openings of the under side or with the supplying means, means for limiting the movement of the cylinder to each position, and means for varying the capacity of each of the radial openings.

7. A machine of the character specified comprising a casing, a cylinder in the casing, the cylinder having a longitudinally extending series of radial openings, and the casing having openings to correspond with those of the cylinder on its under side, said cylinder having means for permitting dough to be supplied to the radial openings at the upper side of the casing, means for rotating the cylinder to register with the openings of the under side or with the supplying means, and means for varying each of the radial openings.

FRANK MANTELL.

Copies of this patent may be obtained for five cents each, by addressing the "Commissioner of Patents, Washington, D. C."